United States Patent
Gross et al.

(10) Patent No.: US 8,306,892 B1
(45) Date of Patent: Nov. 6, 2012

(54) FIXED INCOME SECURITIES INDEX

(75) Inventors: William H. Gross, Laguna Beach, CA (US); Ramin Toloui, Newport Beach, CA (US)

(73) Assignee: Pacific Investment Management Company LLC, Newport Beach, CA (US)

( * ) Notice: Subject to any disclaimer, the term of this patent is extended or adjusted under 35 U.S.C. 154(b) by 847 days.

(21) Appl. No.: 12/270,756

(22) Filed: Nov. 13, 2008

Related U.S. Application Data

(60) Provisional application No. 60/988,396, filed on Nov. 15, 2007.

(51) Int. Cl.
G06Q 40/00 (2012.01)
(52) U.S. Cl. ................................................. 705/36 R
(58) Field of Classification Search .................. 705/36, 705/36 R
See application file for complete search history.

(56) References Cited

U.S. PATENT DOCUMENTS

| | | | |
|---|---|---|---|
| 6,088,685 A | 7/2000 | Kiron et al. | |
| 6,879,964 B2 | 4/2005 | Sauter et al. | |
| 6,901,383 B1 | 5/2005 | Ricketts et al. | |
| 6,941,280 B1 | 9/2005 | Gastineau et al. | |
| 7,099,838 B1 | 8/2006 | Gastineau et al. | |
| 7,305,362 B2 | 12/2007 | Weber et al. | |
| 7,620,577 B2 | 11/2009 | Arnott et al. | |
| 2001/0025266 A1 | 9/2001 | Gastineau et al. | |
| 2003/0074306 A1 | 4/2003 | Rios et al. | |
| 2004/0181477 A1 | 9/2004 | Sauter et al. | |
| 2005/0060254 A1 | 3/2005 | Jones | |
| 2005/0080704 A1* | 4/2005 | Erlach et al. | 705/36 |
| 2005/0171884 A1* | 8/2005 | Arnott | 705/36 |
| 2005/0216387 A1 | 9/2005 | Barany et al. | |
| 2005/0228734 A1 | 10/2005 | Pagani | |
| 2006/0015433 A1 | 1/2006 | Arnott et al. | |
| 2006/0080192 A1 | 4/2006 | McCabe | |
| 2007/0078743 A1 | 4/2007 | Shilpiekandula et al. | |
| 2007/0192228 A1 | 8/2007 | Phelps et al. | |
| 2007/0219894 A1 | 9/2007 | Guichard | |
| 2008/0288416 A1* | 11/2008 | Arnott et al. | 705/36 R |
| 2009/0138407 A1 | 5/2009 | Trease | |
| 2010/0070429 A1 | 3/2010 | Spurgin et al. | |
| 2010/0153296 A1 | 6/2010 | Volpert et al. | |
| 2010/0287113 A1 | 11/2010 | Lo et al. | |

OTHER PUBLICATIONS

Indexuniverse, *Growing Disconnect: Market-cap Weighted Indexes and the GDP Share of China*, Jul. 16, 2007, SeekingAlpha.com.

(Continued)

*Primary Examiner* — Samica L Norman
(74) *Attorney, Agent, or Firm* — Knobbe, Martens, Olson & Bear, LLP

(57) ABSTRACT

An embodiment of a computer-implemented method of generating a financial index includes storing in a computer memory a regional weight for each of one or more regions, and, for each of the regions, a category weight for each of one or more categories of financial instruments issued from the region. At least one of the regional weights does not reflect a market capitalization of the respective region and may be based on, e.g., a gross domestic product for the region. The method also includes programmatically selecting one or more constituent financial instruments for the categories of financial instruments issued from the regions. In some implementations, the constituents do not include equity instruments. The method also includes programmatically calculating, for the categories and regions, subindices based at least in part on the constituent financial instruments, and determining the financial index based at least in part on the subindices, the category weights, and the regional weights.

22 Claims, 9 Drawing Sheets

OTHER PUBLICATIONS

Indexuniverse, *GDP Index Weighting for China Would Likely Backfire*, Jul. 17, 2007, SeekingAlpha.com.

MSCI Barra, *GDP Weighted Indices—Overview and Description of Global Equity Indices*, MSCI Barra, available from http://wwww.mscibarra.com, downloaded Jan. 2008.

Norges Bank, *Choice of a New Benchmark for the Government Petroleum Fund's Fixed Income Investments*, Letter to the Ministry of Finance submitted Aug. 23, 2001, Norges Bank Article No. 15833, last updated May 4, 2003.

People's Daily Online, *Wanted: CIC Bond Managers*, Feb. 1, 2008.

Phoa, Wesley Ph.D., *Global Bond Strategies and Currency Hedging (A Historical Analysis, 1973-1997)*, On The Edge, The Interactive Data Fixed Income Analytics bi-monthly newsletter, Sep./Oct. 1998 Issue.

Shaw, Richard, *Hard to See the Connection Between Country Funds and GDP Growth Rates*, Aug. 3, 2007, SeekingAlpha.com.

Smith, Matthew, *Gross is ready for China to open bond market*, Financial News Online US, Nov. 15, 2007.

* cited by examiner

| Region | Regional Weight ($W_R$) | Category | Category Weight ($W_C$) | Subindex Weight ($W_R \times W_C$) | Name of Subindex |
|---|---|---|---|---|---|
| United States | 28% | Swaps | 22% | 6.22% | U.S. Interest Rate Swaps |
| | | Inflation-Protected Bonds | 11% | 3.11% | U.S. TIPS |
| | | Corporate Debt | 34% | 9.33% | U.S. Corporate Securities |
| | | Securitized Debt | 33% | 9.33% | U.S. Mortgage-Backed Securities |
| Eurozone | 23% | Swaps | 22% | 5.11% | Eurozone Interest Rate Swaps |
| | | Inflation-Protected Bonds | 11% | 2.56% | Eurozone Inflation-Protected Securities |
| | | Corporate Debt | 34% | 7.67% | Eurozone Corporate Securities |
| | | Securitized Debt | 33% | 7.67% | Eurozone Mortgage-Backed Securities |
| Japan | 10% | Swaps | 67% | 6.67% | Japanese Interest Rate Swaps |
| | | Inflation-Protected Bonds | 33% | 3.33% | Japanese Inflation-Protected Securities |
| Other Industrialized Countries (OIC) | 12% | Swaps & Currency | 22% | 2.67% | OIC Interest Rate Swaps |
| | | Inflation-Protected Bonds | 11% | 1.33% | OIC Inflation-Protected Securities |
| | | Corporate Debt | 34% | 4.00% | OIC Corporate Securities |
| | | Securitized Debt | 33% | 4.00% | OIC Mortgage-Backed Securities |
| Emerging Markets (EM) | 27% | External Bonds | 33% | 9.00% | EM External Bonds |
| | | Local Bonds | 33% | 9.00% | EM Local Currency Bonds |
| | | Currency (Forwards) | 34% | 9.00% | EM Markets Foreign Currency |

*FIG. 4*

FIXED INCOME SECURITIES INDEX

CROSS-REFERENCE TO RELATED APPLICATIONS

This application claims the benefit under 35 U.S.C. §119 (e) of U.S. Provisional Patent Application No. 60/988,396, filed Nov. 15, 2007, entitled "Fixed Income Securities Index," the disclosure of which is hereby incorporated by reference herein in its entirety.

BACKGROUND

1. Field

The present disclosure generally relates to a non-equity securities index such as, e.g., a fixed-income securities index, and to financial products and portfolios based on the index.

2. Description of the Related Art

A financial index provides a quantitative measurement of a financial market or a segment of the market. Changes in the financial market are reflected by changes in the financial index. An investor can track the performance of financial indices to provide benchmarks against which the investor can compare the performance of the investor's financial portfolios.

There are many widely publicized indices for the stock (e.g., equity) market and the bond (e.g., fixed income) market. The most widely known equity index is the Dow Jones Industrial Average, which tracks the performance of 30 significant stocks. Other indices attempt to reflect the risk/return characteristics of different portions or segments of a financial market. For example, the Standard & Poor's 500 Index is a stock market index measuring the performance of 500 large, primarily U.S. corporations in leading industries. The Russell 3000 Index is a stock market index measuring the performance of 3,000 publicly-held, large and small U.S. companies.

Bond market indices have been developed to track portfolios of fixed-income securities including government bonds, corporate bonds, and so forth. For example, the Lehman U.S. Aggregate Bond Index is designed to represent investment grade, fixed-rate bonds traded in the U.S., and the Lehman Global Aggregate Index tracks worldwide, investment-grade, fixed-rate debt markets.

Financial indices may be classified according to the method used to determine the value of the index. For example, in a price-weighted index, each constituent security makes up fraction of the index that is proportional to the market price of the constituent. The Dow Jones Industrial Average is a price-weighted equity index. In a market capitalization-weighted index, each constituent security makes up a fraction of the index that is proportional to the market capitalization (or market value) of the constituent. The Russell 3000 Index is a market capitalization-weighted equity index, and the Lehman aggregate indices are market-capitalization weighted bond indices.

SUMMARY

Existing financial indices, and in particular fixed income indices, suffer from disadvantages and limitations, which are addressed at least in part by various embodiments disclosed herein.

Embodiments of a computer-implemented method of managing a fixed income financial index are disclosed. In one embodiment, the method comprises storing in a computer memory a regional weight for each of a plurality of regions of the world. Each of the regional weights is based at least in part on a gross domestic product for the region. The method further comprises storing in a computer memory, for each of the plurality of regions, a category weight for each of a plurality of categories of fixed income financial instruments issued from the region. The method further comprises storing in a computer memory asset data for a universe of fixed income instruments representing each of the plurality of categories of instruments in each of the plurality of regions. The fixed income instruments comprise one or more of the following: (i) fixed income securities, (ii) fixed income derivatives, or (iii) fixed income forwards. The method also includes programmatically allocating, in one or more processors, one or more constituent instruments from the universe of fixed income instruments to each of the plurality of categories in each of the plurality of regions and programmatically determining a constituent weight for each of the constituents allocated to each of the plurality of categories in each of the plurality of regions. The method further comprises programmatically calculating a subindex for each of the plurality of categories in each of the plurality of regions. Each subindex can be based at least in part on the allocated constituents and the respective constituent weights. The method further comprises programmatically transforming the subindices, the category weights, and the regional weights into a value for the financial index.

Embodiments of a computer-implemented method of generating a financial index are disclosed. In one embodiment, the method comprises storing in a computer memory a regional weight for each of one or more regions. In this embodiment, at least one of the regional weights does not reflect a market capitalization of the respective region. For example, a regional weight may be based on a gross domestic product for a region. The method also comprises storing in a computer memory, for each of the regions, a category weight for each of one or more categories of financial instruments issued from the region. The method also includes programmatically selecting one or more constituent financial instruments for each of the one or more categories of financial instruments issued from each of the one or more regions. In certain embodiments, the constituent financial instruments do not include equity instruments. For example, the financial instruments may comprise fixed income securities, fixed income derivatives, or fixed income forwards. In some implementations, the selection of one or more constituent financial instruments need not be performed if the category weight or the regional weight is less than or equal to a threshold weight. The method can also include programmatically calculating a subindex based at least in part on the constituent financial instruments selected for each of the one or more categories of financial instruments issued from each of the one or more regions. In some implementations, the subindex need not be programmatically calculated if the number of constituents for that category and that region is less than a threshold number. The method further comprises programmatically calculating the financial index based at least in part on the programmatically calculated subindices, the stored category weights, and the stored regional weights.

Embodiments of a computer-implemented method of managing a fixed income index are disclosed. In one embodiment, the method comprises storing in a computer-readable medium asset data for a universe of fixed income instruments issued from a plurality of international regions. The plurality of international regions can comprise at least a first region comprising a developed country and a second region comprising an emerging market country. The method further comprises programmatically selecting a first plurality of fixed income instruments from the first region and a second plurality of fixed income instruments from the second region to be represented in the index. The first plurality can comprise instruments in at least each of the following asset classes: (1) inflation-linked government debt and (2) interest rate swaps. The second plurality can comprise instruments in at least the following asset class: (3) government debt denominated in non-domestic currency. The method also includes programmatically determining a value for the fixed income index by weighting the first plurality and the second plurality of fixed income instruments, where the weightings can be based at least in part on a first non-market capitalization metric of the first region and a second non-market capitalization metric of the second region.

Embodiments of a system for calculating a financial index are disclosed. In one embodiment, the system comprises a storage system and an index calculation module configured to be executed on one or more processors and to communicate with the storage system. The storage system can be configured to store information comprising regional weights for one or more regions, category weights for one or more categories of non-equity financial instruments issued from the one or more regions, and asset data relating to the non-equity financial instruments issued from the regions. In some implementations, the regional weights do not reflect market capitalization of the regions. For example, the regional weight for a region may be based at least in part on gross domestic product from the region. The index calculation module can be configured with executable instructions for determining, based at least in part on the asset data, lists of the non-equity financial instruments in the categories of financial instruments in the regions. The index calculation module can also be configured with executable instructions for calculating subindices for the categories of financial instruments in the regions, where the subindices are calculated at least in part from the lists of non-equity financial instruments and the asset data. The index calculation module can also be configured with executable instructions for calculating the financial index based at least in part on the subindices, the category weights, and the regional weights.

In various embodiments, a financial instrument or a financial fund can be based at least in part on embodiments of a financial index generated or managed according to implementations of the systems and methods disclosed herein. For example, financial instruments can include total return swaps or structured products. Financial funds can include a mutual fund, an exchange traded fund, an index fund, and so forth.

BRIEF DESCRIPTION OF THE DRAWINGS

Throughout the drawings, reference numbers may be re-used to indicate correspondence between referenced elements. The drawings are provided to illustrate embodiments of the inventions described herein and not to limit the scope thereof.

FIG. 4 is a table that provides an example of regional weights, category weights, and subindex weights for an embodiment of a fixed income financial index including five regions.

DETAILED DESCRIPTION OF PREFERRED EMBODIMENTS

Figure 1:
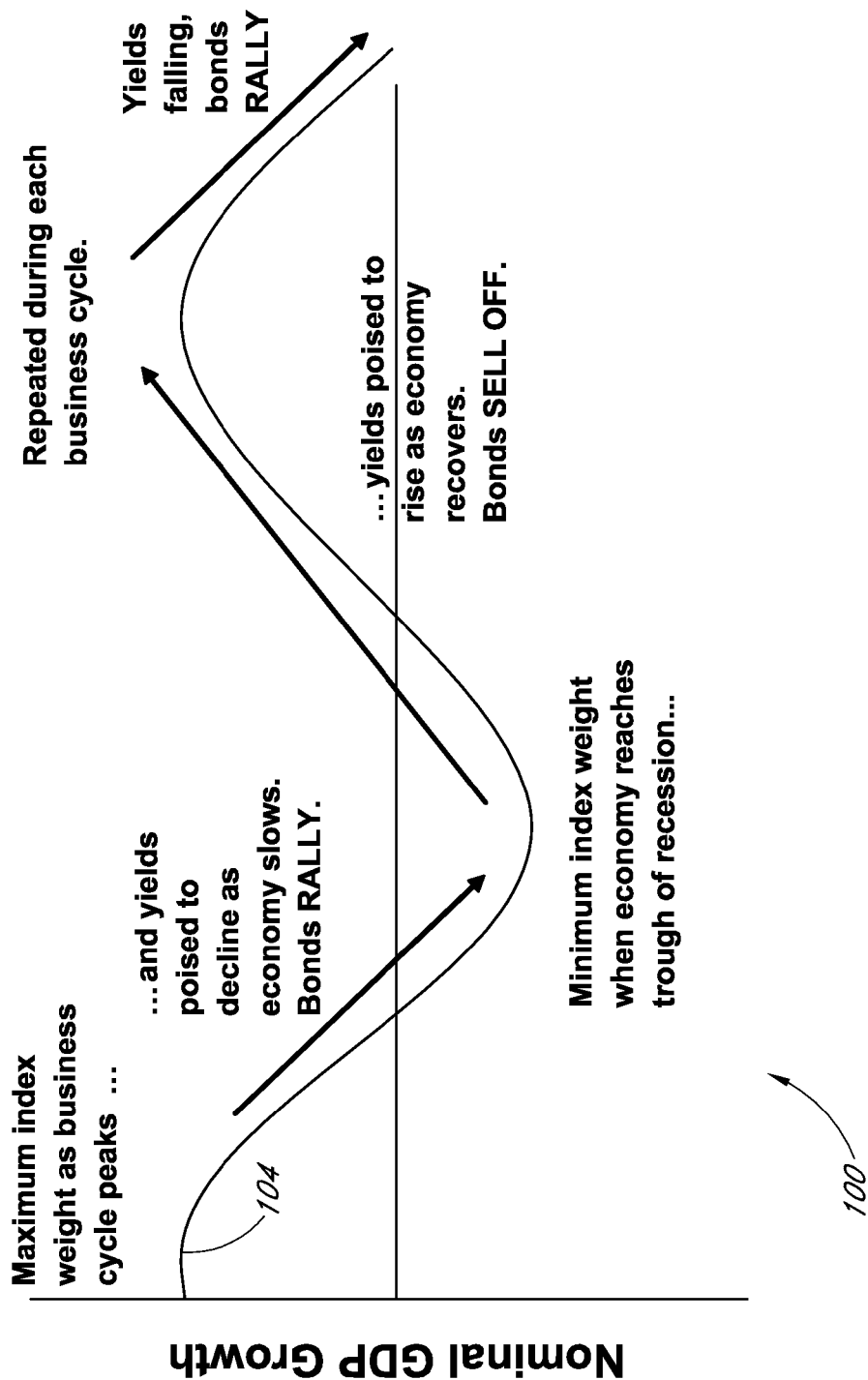
FIG. 1 is a graph that schematically represents nominal growth of gross domestic product (GDP) over a business cycle.

Overview of Embodiments of a Global Fixed Income Index

Changes in global economies and markets have begun to transform fixed income (non-equity) investment opportunities, and new markets are becoming available for investors. For example, emerging markets are becoming increasingly important in the global economy. The growth of emerging markets is impacting global trade, commodities, and global savings and investment. Emerging market countries are becoming key destinations for, as well as allocators of, global capital, and emerging market countries are becoming lenders to developed nations on a historically unprecedented scale.

New investment opportunities are also becoming available to fixed income investors due in part to the deepening of capital markets throughout the world and the continued globalization of capital flows. For example, derivatives (such as, e.g., interest rate swaps), inflation-linked and other indexed securities, emerging market debt in local currencies are important components of today's universe of fixed income financial instruments.

Existing fixed income indices suffer from various disadvantages. For example, existing bond indices do not adequately represent the full universe of global fixed income investment vehicles and opportunities available to and widely used by investors. Many existing bond indices give disproportionate weight to U.S. Treasury bonds (a large portion of which are locked up as foreign central bank reserves) and do not include widely traded instruments such as interest rate swaps, inflation-linked bonds, and emerging market debt denominated in local currency.

Existing fixed income indices have other disadvantages. For example, fixed income indices generally are market-capitalization weighted. Although there may be some rationales for using market-capitalization weighted equity indices (e.g., market efficiency under the assumptions of the capital asset pricing model), existing market-capitalization weighted fixed income indices inadequately reflect the growth in today's global fixed income marketplace. For example, because development of capital markets tends to lag economic development, market capitalization weighting tends to provide a "backward" look at where economic markets were in the past rather than where economic markets will be developing in the future.

Another disadvantage of market capitalization weighting is that it tends to give too much weight to overpriced assets. This occurs because as the price of the asset goes up, so does its index weight. This embeds an inherent "buy high, sell low" attribute into a market capitalization weighted index, which can impair returns over the long run. A prominent example of this phenomenon is the large weight that technology stocks attained in some U.S. equity indices during the technology bubble of the late 1990s.

Further, market capitalization weighting tends to overweight the index with companies or countries having larger amounts of debt. Because such highly indebted companies or countries may be less creditworthy, market capitalization weights tend to be inversely related to credit quality of the issuer.

Accordingly, there is a need for fixed income indices that address some or all of the problems and limitations with existing fixed income indices. As will be further described below, embodiments of the fixed income index can be designed to include one or more of the following advantageous features.

Embodiments of the index can include financial instruments representing a broad universe of debt in the global capital market ranging from fully developed economies to emerging market economies. By selecting index constituents from such a broad universe, the index may more accurately represent the global opportunity set for non-equity investments. Also, by including a broad range of possible index constituents, the index may avoid the disproportionate allocation of government bonds in existing aggregate fixed income indices and may more accurately reflect the types of instruments actually traded by investors and fund managers. For example, in some embodiments, the index can include widely traded instruments such as interest rate swaps and inflation-indexed securities, which represent important sources of nominal and real fixed income return, respectively. An index that includes instruments actually traded by fixed income investors may advantageously provide a more investable index that can be tracked and/or replicated by portfolio managers and that can serve as the basis for financial products (e.g., total return swap, derivative instrument, structured product, etc.).

Embodiments of the index can be weighted by factors other than market capitalization. For example, economic measures of the growth, wealth, income, purchasing power, output, investment, expenditures, production, and/or trade of a country and/or region may be used as weighting factors. In some embodiments, weights allocated to countries or regions represented in the index are based on a gross domestic product (GDP) of the country or region. GDP-weighting in certain embodiments of the disclosed indices advantageously avoids many of the pitfalls associated with market-capitalization weighting. For example, weighting regions by GDP increases the proportion of emerging market fixed income instruments (compared to market-capitalization indices) and therefore captures the increased role of the emerging markets in the global economy.

Use of GDP-weighting in a fixed income index can have distinct advantages that make it differ fundamentally from the use of GDP-weighting in global equity indices (e.g., the MSCI GDP-weighted World index). Equity prices tend to move pro-cyclically with GDP growth (e.g., when nominal GDP increases, equity prices tend to increase). In contrast, bond prices tend to move counter-cyclically with GDP growth (i.e., when nominal GDP increases, bond prices tend to fall). As discussed below with reference to FIGS. 1-2C, the inventors of the present application have found that this countercyclical feature of a GDP-weighted fixed income index can increase returns of certain embodiments of the index compared to market-capitalization weighted fixed income indices. Such a benefit does not obtain in equity indices because they are pro-cyclical.

FIG. 1 is a graph 100 that schematically represents nominal GDP growth 104 over a business cycle. GDP weights tend to be largest as the business cycle peaks (and bond prices are lowest) and smallest when the economy reaches the trough of a recession (and bond prices are highest). As economic growth recedes from the peak of the business cycle, market yields tend to decline and prices of fixed income securities (e.g., bonds) tend to rally. Since a relatively high GDP-weight is assigned to fixed income assets at the peak of the business cycle, a GDP-weighted fixed income index tends to capture the bond rally. Conversely, as the economy recovers, bonds tend to sell off. However, since relatively lower GDP-weights are assigned to such assets at the trough of the cycle, a GDP-weighted fixed income index tends not to lose as much value during the sell off. Accordingly, GDP-weighting of a global fixed income index may provide previously unrecognized advantages over a global market-capitalization weighted fixed income index.

Figure 2A:
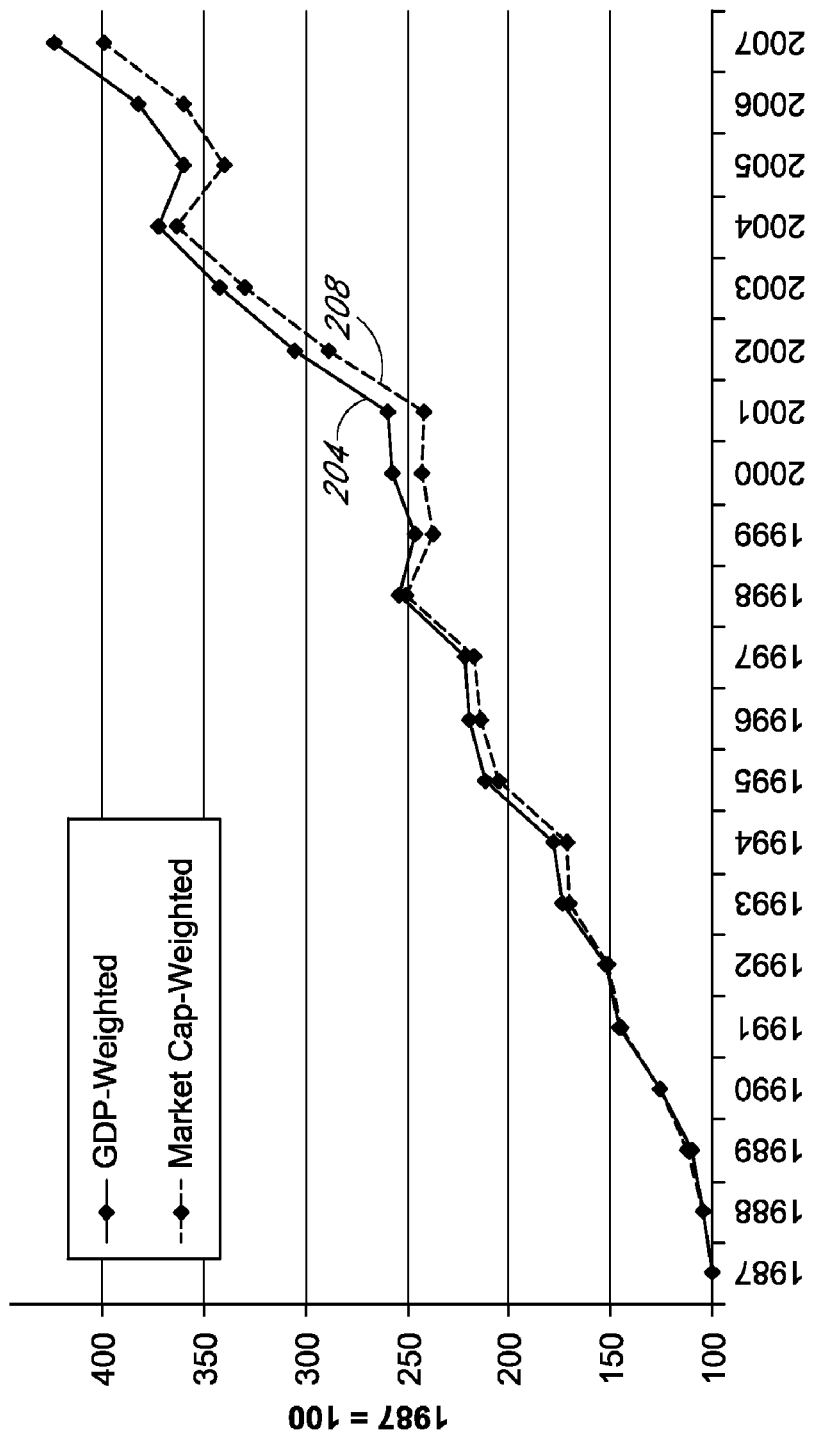
FIG. 2A is a graph showing hypothetical total return of an example of a GDP-weighted index (solid curve) and actual total return of an example of a market capitalization weighted index (dashed curve) over a 20 year time period.
Figure 2B:
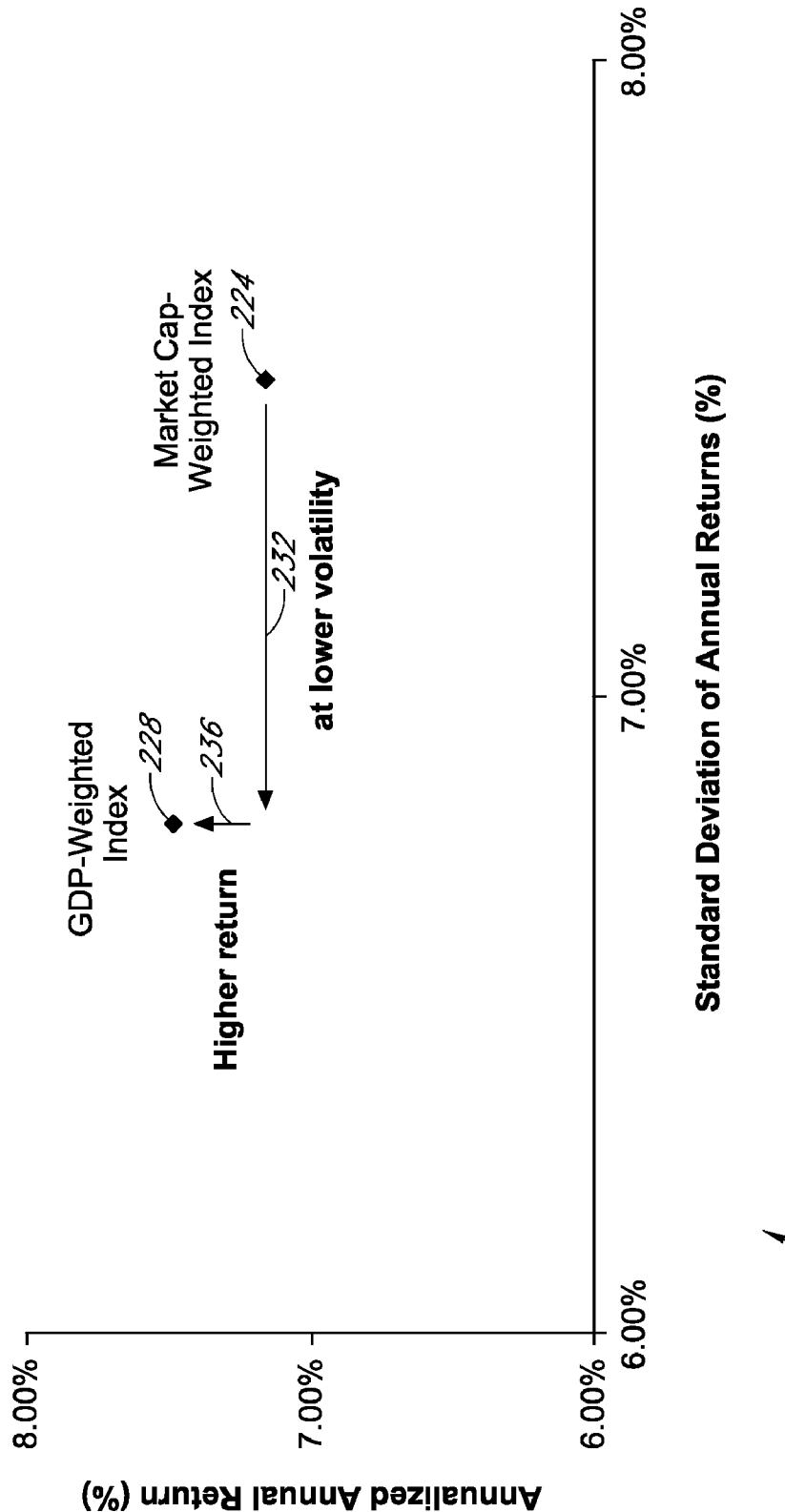
FIG. 2B is a graph showing that the annualized return of the example of the GDP-weighted index from FIG. 2A is achieved at lower volatility compared to the example of the market-capitalization weighted index from FIG. 2A.
Figure 2C:
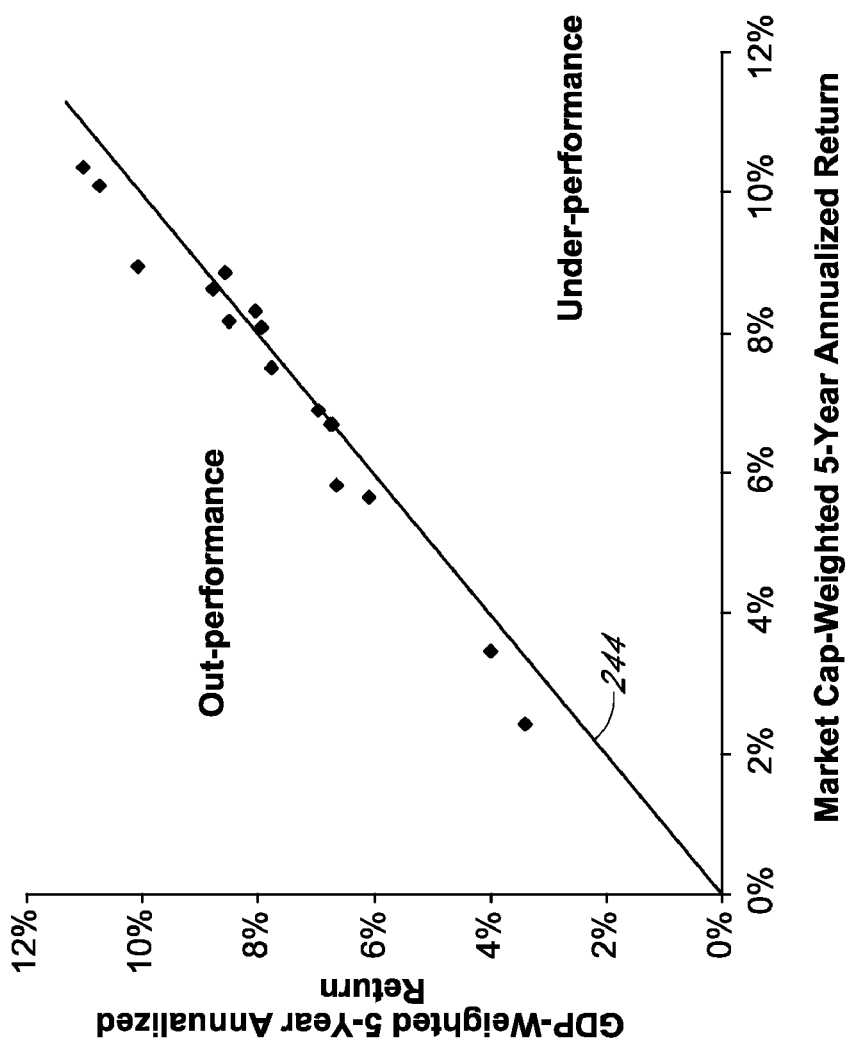
FIG. 2C is a graph illustrating annualized return of the example of the GDP-weighted index from FIG. 2A versus annualized return of the example of the market capitalization weighted index from FIG. 2A.

Evidence of these advantages may be found by looking at historical data, as illustrated in FIGS. 2A-2C. FIG. 2A is a graph 200 that displays the actual historical total return 208 of a widely used bond benchmark, the JP Morgan Government Bond Index-Global, which assigns weights to each of the constituent countries by market capitalization. FIG. 2A also displays the hypothetical total return 204 of a version of this index, which assigns weights to each of the constituent countries according to GDP. FIG. 2A shows that the GDP-weighted version of the index exhibits an annualized total return (7.48%) that is 0.32 percentage points higher than the annualized total return (7.16%) of the market capitalization version over this period. The higher return of the GDP-weighted version compared to the market capitalization version is significant in relation to the total return of the index.

FIG. 2B is a graph 220 showing that the higher annualized return 236 of the GDP-weighted version 228 of the index was accompanied by lower volatility 232 of annual returns (measured by standard deviation of the returns) when compared to the market capitalization-weighted version 224 of the index.

FIG. 2C is a graph 240 that illustrates that the GDP-weighted version of the index outperformed the market capitalization version with a high degree of consistency. The vertical axis of the graph 240 shows the annualized return of the GDP-weighted version for rolling 5-year periods, and the horizontal axis of the graph 240 shows the annualized return for the market capitalization weighted version for rolling 5-year periods. The solid line 244 shows equal performance between the two versions of the index. Points above the line 244 indicate out-performance of the GDP-weighted version compared to the market capitalization weighted version. FIG. 2C demonstrates that the GDP-weighted version registered performance equal to or greater than the market capitalization weighted index in 13 of 16 rolling 5-year periods.

Figure 2D:
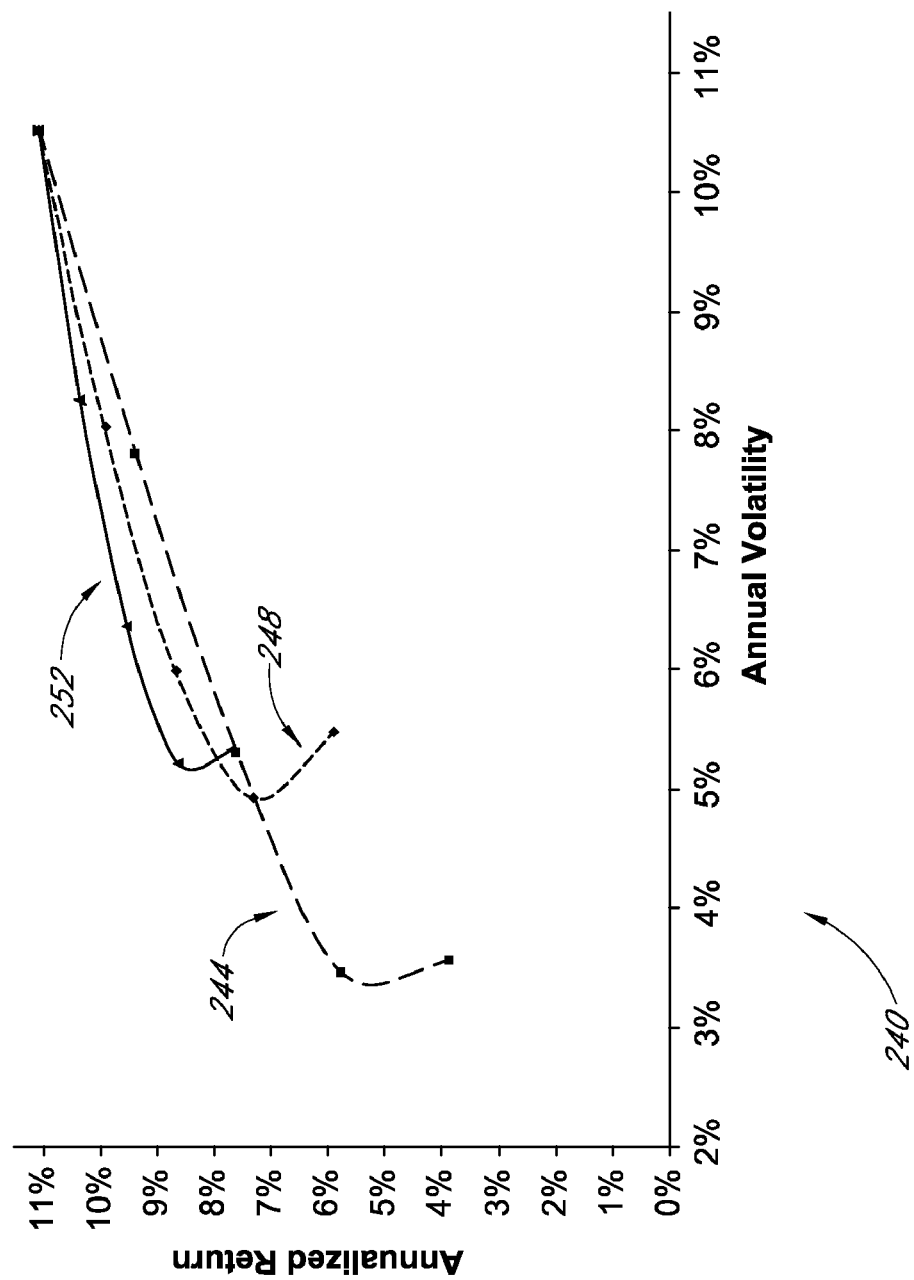
FIG. 2D is a graph showing examples of annualized returns versus annual volatility for three equity/bond portfolios over a five year period, using three different fixed income indices as the bond component. The dashed and dotted curves show market capitalization weighted bond index components, and the solid curve shows an example of a GDP-weighted bond index component.

Non-market capitalization weighting of a global fixed income index may provide other advantages. FIG. 2D is a graph 240 showing examples of annualized returns versus annual volatility for three example equity/bond portfolios over a five year period, using three different fixed income indices as the bond component. Dashed curve 244 uses a market-capitalization weighted index for investment grade, fixed rate U.S. bonds. Dotted curve 248 uses a market-capitalization weighted global bond index for investment grade fixed income debt. Solid curve 252 uses an embodiment of a GDP-weighted global fixed income index as disclosed herein. FIG. 2D demonstrates that portfolios using the GDP-weighted global fixed income index 252 provide larger annualized returns for a given volatility level than either of the market-capitalization fixed income indices 244 and 248. Accordingly, a portfolio of fixed income securities selected to track the asset allocations in the GDP-weighted global index 252 would advantageously provide an investor with higher returns for a given risk level than would a market-capitalization weighted fixed income portfolio.

Embodiments of the disclosed index may include other features and advantages. For example, in certain embodiments, the index includes categories of financial instruments representing investable sources of capital debt in each country or region represented in the index. The categories of debt may include, for example, corporate debt, government debt (issued in externally-denominated and/or internally-denominated currency), inflation-indexed debt (e.g., inflation-linked government bonds), securitized debt (e.g., mortgage backed securities), derivatives (e.g., interest rate swaps), currency (e.g., foreign exchange deliverable and/or non-deliverable forwards, short-term treasury bills, etc.), commodities, bank loans, and so forth. Other categories of financial instruments can be included in other embodiments. For example, categories may be established for instruments such as futures, options, currency swaps, credit default swaps, and so forth. New categories can be added as new securities and/or derivatives are developed and/or become widely traded. For example, a category for inflation-linked bonds in emerging markets can be added as these instruments develop.

The categories represented in the index may vary by country or region. For example, in some embodiments, instrument categories for developed countries include swaps, inflation-linked securities, corporate debt, and asset-backed securities, whereas instrument categories for emerging markets include government debt (externally-denominated and internally-denominated) and foreign exchange (FX) debt. In some embodiments of the index, the instrument categories are weighted based on factors other than market capitalization. For example, the weights may be based on some or all of the risk exposures that drive risk-adjusted total returns such as, e.g., interest rates, credit, and volatility. In some embodiments, the categories may be weighted equally or proportionally among all (or a subset) of the categories.

Portfolios of securities can be developed that track embodiments of the financial indices disclosed herein. Investment companies can be established to sell and redeem shares based on such portfolios. For example, open-end funds, closed-end funds, exchange traded funds, and/or unit investment trusts could be set up to provide shares in portfolios based at least in part on one or more of the indices described herein. In some embodiments, a fund may be passively managed with an investment objective to track performance of an embodiment of the financial index. In other embodiments, a fund may be actively managed by an investment advisor with an investment objective of meeting or beating the performance of an embodiment of the index. Financial products (e.g., total return swaps, structured products, derivative instruments, etc.) may be developed based at least in part on embodiments of the financial index. These are examples of practical and advantageous applications and uses of the index. Other applications and uses are possible. Certain preferred examples and embodiments will now be described with reference to the drawings summarized above.

Examples of Methods for Generating a Fixed Income Index

Figure 3:
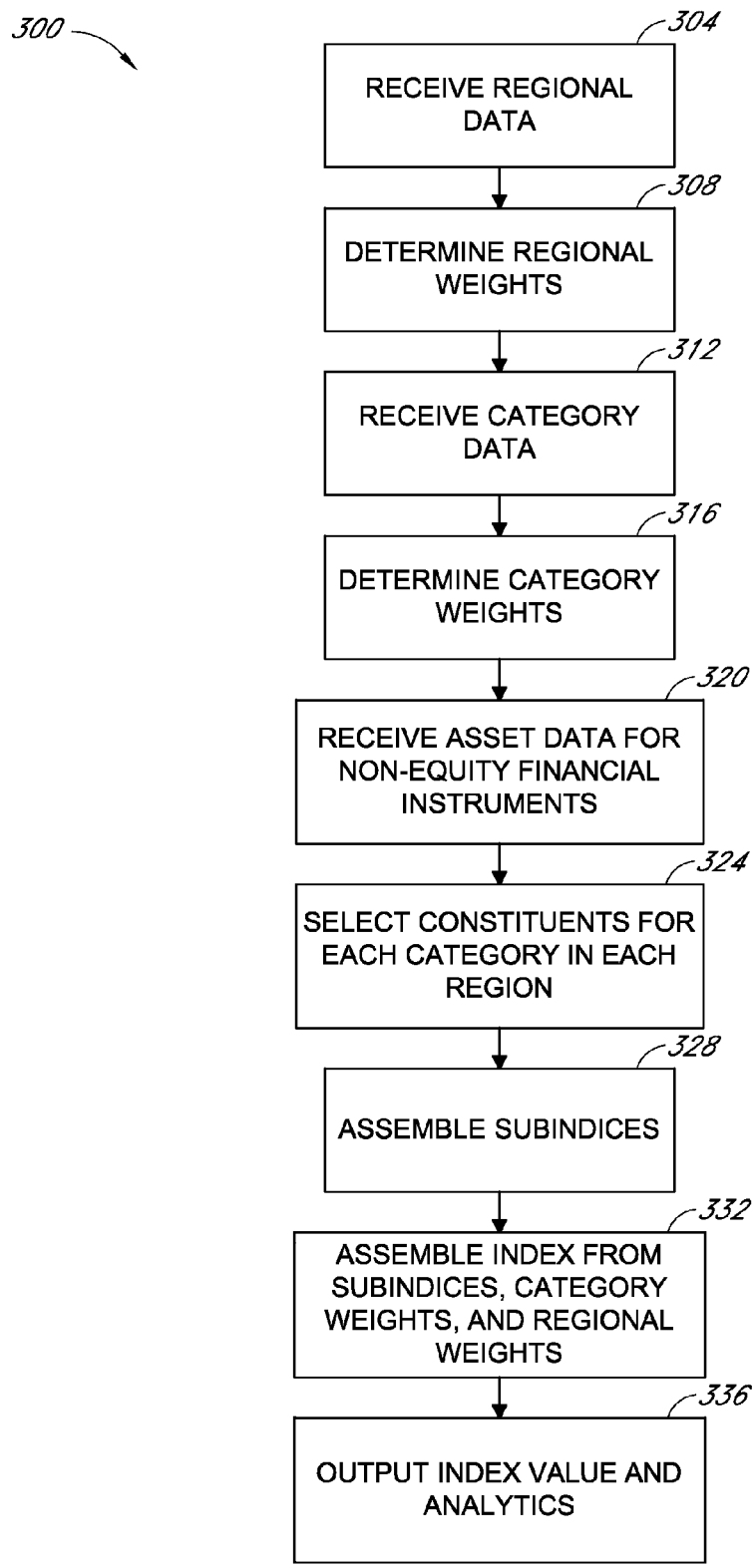
FIG. 3 is a flowchart showing an embodiment of a method for generating a non-equity financial index.

FIG. 3 is a flowchart showing an embodiment of a method 300 for generating an embodiment of a global fixed income securities index. A processor or computer system can be configured to particularly perform some or all of blocks 304-332 of the method 300 (see, e.g., FIG. 5). In some embodiments, the method 300 can be partially or fully automated by one or more computers or processors. The embodiment of the method 300 shown in FIG. 3 is intended to be illustrative and not to be limiting. For example, some or all of blocks 304-332 can be combined, rearranged, and/or omitted in different embodiments. An example of a possible implementation for the index is described in Appendix A, which is hereby incorporated by reference herein and made part of this specification.

Regional Weights

In block 304, data is obtained for one or more regions of the world that are represented in the index. The regional data can be stored on and retrieved from any suitable computer-readable storage medium. Based at least in part on this data, regions can be established using any suitable metric or metrics including, for example, geographical, economic, financial, or political metrics, or any combination of such metrics. A region can include one or more countries, nations, nation states, sovereignties, territories, city states, geopolitical units, and so forth. In some embodiments, a single region is included in the index, for example, to represent the world's fixed income market. A region may be classified based on factors such as growth and/or volatility of economic markets and/or degree of economic industrialization. For example, a region may include one or more economies that are classified as a developed market, a developing market, an emerging market (EM), or a frontier or pre-emerging market. In some embodiments, a region can include one or more countries that are situated in a geographical region (e.g., Europe, East Asia, etc.). In other embodiments, a region can include a bloc of countries primarily defined by non-geographical factors (e.g., economic, financial, and/or political factors). For example, regions may include groups of countries established by the World Trade Organization (e.g., the G4 bloc, the G20 developing nations, etc.), the World Bank, the International Monetary Fund (IMF), etc.

In certain embodiments, five regions are included in the financial index: (1) the United States, (2) the Eurozone (e.g., members of the European Union that have adopted the Euro as domestic currency), (3) Japan, (4) Other Industrialized Countries (e.g., Australia, Canada, Denmark, Iceland, New Zealand, Norway, Sweden, Switzerland, and the United Kingdom), and (5) emerging markets (EM). In some embodiments, Canada is grouped with the United States rather than with Other Industrialized Countries. In some embodiments, the Other Industrialized Countries region excludes countries having a GDP below a threshold value (e.g., 0.5%) of the aggregate GDP for this region. For example, Iceland is excluded from the Other Industrialized Countries region in some embodiments. The EM region may be classified as including all countries not included in the other four regions. Also, EM countries may be excluded if their GDP is below a threshold value (e.g., 0.5%) of the aggregate GDP for the EM region. In other embodiments, other regions can be used.

In block 308 of the example method 300, regional weights are determined for each of the regions included in the financial index. The regional weights may, but need not, be different for each of the regions. In certain embodiments, at least one regional weight does not reflect a market capitalization of the region. In certain such embodiments, none of the regional weights reflect market capitalization. The regional weights can be determined based at least in part on the regional data obtained in block 304. For example, geographical, economic, financial, and/or political data can be used in determining some or all of the regional weights.

In some embodiments, at least some of the regional weights are based at least in part on GDP. For example, the regional weight for each region may be equal to the GDP of the region divided by the cumulative GDP for all the regions included in the index. As used herein, GDP is a broad term and is used in its ordinary sense to include any measure of the income, wealth, output, production, and/or trade for a region's economy and/or financial markets. For example, in some embodiments, GDP is defined as the total market value of all final goods and services produced within the region in a given time period (typically, one calendar year). In some embodiments, GDP represents the sum of value added at each stage of production of all final goods and services produced within the region in a given time period. In various embodiments, a GDP value can be calculated to represent gross national product, gross national income, regional wealth estimates from the World Bank, and so forth. A GDP value can also be calculated on a per capita basis and/or to account for inflation (e.g., real GDP), currency exchange rates and/or relative purchasing power of different currencies, depreciation of capital (e.g. net domestic product), value of intermediate goods and services, etc. Any suitable combination of GDP metrics can be used.

In some cases, regional weights are determined using historical data from one or more regions. For example, a regional weight may represent a combination of one or more economic or financial factors averaged over a time period (e.g., a 3-year or 5-year trailing average). Some or all of the regional data (e.g., historical data) and/or the regional weights may be mathematically and/or statistically processed by, for example, smoothing, averaging, filtering, interpolating, extrapolating, and/or trending. Some such embodiments may advantageously provide regional weights that have fewer fluctuations caused by uncertainties and/or errors in measurements of the underlying regional data. In some embodiments, statistical, mathematical, and/or econometric techniques (e.g., regression) may be applied to the regional data in order to calculate the regional weights. In some implementations, some or all of the regional weights can be selected according to other criteria (e.g., equal-weighting among certain regions).

A first example of GDP weights for an embodiment of the financial index that includes five regions are provided for a four year time period in Table 1A. For any year, the GDP weights are calculated from historical GDP data as equally-weighted, three-year trailing averages.

TABLE 1A

| Region | 2004 | 2005 | 2006 | 2007 |
|---|---|---|---|---|
| United States | 29.4% | 28.3% | 27.1% | 26.5% |
| Eurozone | 20.1% | 21.3% | 21.9% | 21.6% |
| Japan | 11.4% | 10.9% | 10.4% | 9.6% |
| Other Industrialized Countries | 10.7% | 11.2% | 11.6% | 11.8% |
| Emerging Markets | 28.4% | 28.3% | 29.0% | 30.5% |

A second example of GDP weights for an embodiment of the financial index that includes five regions are provided for a five year time period in Table 1B. For any year, the GDP weights are calculated from historical GDP data as equally-weighted, five-year trailing averages.

TABLE 1B

| Region | 2004 | 2005 | 2006 | 2007 | 2008 |
|---|---|---|---|---|---|
| United States | 30.8% | 30.4% | 29.6% | 28.6% | 27.4% |
| Eurozone | 21.2% | 21.5% | 22.1% | 22.4% | 22.6% |
| Japan | 13.0% | 12.3% | 11.4% | 10.6% | 9.8% |
| Other Industrialized Countries | 11.2% | 11.5% | 11.8% | 12.1% | 12.3% |
| Emerging Markets | 23.8% | 24.3% | 25.1% | 26.3% | 27.9% |

As can be seen by comparing Tables 1A and 1B, the values of GDP-weights based on averages of historical data may depend on the time period over which the average is performed. In other embodiments of the index, different averaging methods (and/or weighting techniques for the averages) may be used.

Table 2 provides two examples of GDP-based regional weights, two examples of trade-based regional weights, and a comparative example of market capitalization weights. The GDP-based regional weights are evaluated based on market exchange rates and based on purchasing power parity (PPP) exchange rates. PPP-based GDP attempts to equalize for differences in purchasing power of different currencies among the regions. The trade-based regional weights are shown based on net trade and based on all trade in the regions. The weights shown in Table 2 were based on historical data from statistical reports prepared by the IMF. GDP-based regional weights are five year, equally-weighted trailing averages.

TABLE 2

| Region | GDP (Market Exchange Rates) | GDP (PPP) | Share of World Trade (Net Trade) | Share of World Trade (All Trade) | Market Capitalization (Total Size of Debt Market) |
|---|---|---|---|---|---|
| United States & Canada | 32% | 22% | 17% | 15% | 42% |
| Eurozone | 22% | 15% | 25% | 28% | 25% |
| Japan | 12% | 7% | 8% | 5% | 14% |
| Other Industrialized Countries | 9% | 6% | 14% | 9% | 10% |
| Emerging Markets | 25% | 50% | 35% | 42% | 8% |

The example weights shown in Table 2 indicate that trade-weighting and PPP-based GDP-weighting produce the lowest weights for the U.S. and Canada region and the highest weights for the EM region. Table 2 also shows that regional weightings based on factors such as GDP and world trade produce a much higher weight for the EM region (and a lower US/Canada weight) than would be produced by a market capitalization-weighted index.

The regional weights provided in Tables 1A, 1B, and 2 are intended to be illustrative examples. In other embodiments of the financial index, the regional weights may be different than shown in these tables.

Category Weights

In some embodiments of the financial index, one or more categories of financial instruments are established for some or all of the regions represented in the index. In some cases, each region includes the same categories. In other cases, the categories vary depending on the region, e.g., a category may be included for one region but not for another region. For example, the market for certain categories of instruments in a region may be sufficiently limited (or outlawed) that the category is excluded from the index for that region.

Categories of instruments may include, for example, corporate debt (e.g., secured or unsecured debt, fixed or floating rate bonds, zero coupon bonds, convertible bonds, bonds with embedded options, etc), government debt (e.g., treasury securities, inflation-linked bonds, debt issued in domestic or non-domestic currency, short term currency bonds, etc.), debt by government affiliated entities, agencies, or municipalities (e.g., Fannie Mae, Freddie Mac, municipal bonds, etc.), securitized debt (e.g., asset-backed securities, mortgage-backed securities, collateralized debt obligations, etc.), derivatives (e.g., interest rate swaps, currency swaps, total return swaps, FX swaps, credit default swaps, deliverable or non-deliverable forwards or futures, bond options, credit derivatives, credit linked notes, etc.), or any combination of any of these financial instruments. Additional categories can be established as new financial instruments become available or become widely traded. Other categories can be established for other embodiments of the index (e.g., commodities).

In block 312, data is obtained for the one or more categories of financial instruments. The category data may be stored on and retrieved from any suitable type of computer-readable medium. The category data may include any suitable financial information including, e.g., the types and volume of instruments traded in each region. The category data may include data on individual financial instruments including, e.g., prices (bid and/or ask), yields, rates (interest, inflation, FX, etc.), coupons, volume, maturities, notional amounts, credit ratings, sector classifications, and so forth. In some implementations of the index, the category data is used to determine whether some or all of the categories are selected for a region represented in the index. For example, if the market value of investable instruments in a particular category in a region is above a threshold, the category of financial instruments may be included in the region. As new types of instruments became available and/or widely traded, new categories may be added to a region. Also, categories of financial instruments can be removed from a region if, for example, trade of the instrument decreases below a threshold volume. In some embodiments, the categories (and/or the regions) are selected so that the financial index is replicable and investable by investors and fund managers. For example, in some embodiments, financial markets eligible for inclusion in the index should have a size greater than USD 10 billion (or equivalent).

In block 316 of the example method 300, category weights are determined for each of the categories included in each of the regions represented in the financial index. The category weights may, but need not, be different for each of the categories in any region. Also, the weight for a particular category may, but need not, be different from region to region. If a category is excluded from a region, the weight assigned to the category may be set to zero (or a suitably small value). In certain embodiments, at least one category weight in a region does not reflect a market capitalization of the category in that region. In certain such embodiments, none of the category weights reflect market capitalization of the categories in the region. The category weights can be determined based at least in part on the category data obtained in block 312 and/or the regional data obtained in block 304. For example, the category weights may be based on some or all of the risk exposures for (non-equity) fixed income securities (e.g., interest rates, credit, and volatility).

In some implementations of the index, some or all of the categories selected for a region are given an equal weight or a proportional weight. For example, in some embodiments, if the number of categories in a region is N, the category weights are approximately 1/N. A person of ordinary skill will understand that equal weights or proportional weights may depart from precise numerical equality or proportionality, respectively, due to numerical roundoff, floating point truncation, etc.

An example of category weights for an embodiment of the financial index including five regions is provided in Table 3. In this example, the choice of categories and their weightings can be different for different regions (e.g., compare the category weights for the U.S. and Japan). Also, in this example, no region includes each of the categories of instruments, however, this is not a requirement, and in other embodiments, one or more regions may include all categories.

TABLE 3

| Category | United States | Eurozone | Japan | Other Industrialized Countries | Emerging Markets |
|---|---|---|---|---|---|
| Interest Rate Swaps | 22.1% | 22.1% | 66.7% | 22.1% | 0% |
| Inflation-Linked Government Bonds | 11.1% | 11.1% | 33.3% | 11.1% | 0% |
| Fixed Rate Corporate Bonds | 33.4% | 33.4% | 0% | 33.4% | 0% |
| Securitized Debt | 33.3% | 33.3% | 0% | 33.3% | 0% |
| Externally-denominated Debt | 0% | 0% | 0% | 0% | 33.4% |
| Currencies | 0% | 0% | 0% | 0% | 33.3% |
| Local Currency Debt | 0% | 0% | 0% | 0% | 33.3% |

In this example, the category for interest rate swaps includes funded interest rate swaps with standard maturities. The swaps can be rolled into new on-the-run swaps on a monthly basis. In some embodiments, the swap maturities are the same for each region represented in the index. For example, in one embodiment, the weights for swaps with different maturities are: 45% for 2 year swaps, 30% for 5 year swaps, 20% for 10 year swaps, and 5% for 30 year swaps. The category for inflation-linked government bonds in this example includes bonds issued by central governments whose coupon and principal are linked to a domestic measure of inflation (e.g., a consumer price index). In some embodiments, only fixed rate bullet bonds and amortizing bonds are eligible for this category. The category for fixed rate corporate bonds in this example includes fixed rate and step-up coupon bonds issued by corporations. In some embodiments, floating rate notes, zero coupon bonds, and callable or putable bonds are excluded from eligibility. In some embodiments, callable subordinated debt may be included in this category. In this example, the category for securitized debt includes public sector mortgage backed securities (MBS). In some implementations, the U.S. MBS component includes forward agreements to purchase mortgages such as, e.g., mortgage TBA ("to be announced") pass-through securities. In various embodiments, private sector residential mortgage backed securities (RMBS) from individual issuers may be included or excluded from this category.

The last three categories in the example shown in Table 3 are included only in the emerging markets region, but this is not a limitation on the disclosed methods and systems. The category for externally-denominated debt can include government debt denominated in non-domestic currency such as U.S. dollars or euros. In some embodiments, this category includes bonds available in the international market such as fixed rate, non-callable bullet bonds or sinking funds. The category for currencies in this example includes exposure to FX and money market debt. The category may include deliverable and/or non-deliverable forwards having a range of maturities. For currencies without active forward markets, the category may include recently issued treasury bills (e.g., 3-month bills). The category for local currency debt in this example includes fixed rate, non-callable central government debt denominated in local (domestic) currency. A market may be excluded if it has adopted a hard currency as domestic legal tender. In some embodiments, financial markets are included in this category if the market is investable, for example, not having significant capital controls, access restrictions, or lack of liquidity. In some cases, the category can include bullet bonds and sinking funds with a time to maturity greater than 12 months (or 18 months at issuance).

The regions, categories, and category weights provided in Table 3 and discussed above are intended to be illustrative, non-limiting examples. In other embodiments of the financial index, the regions, categories, and category weights may be different than shown and described with reference to Table 3.

Constituent Selection

In block 320, asset data is obtained for financial instruments that are candidates for inclusion in the index. The asset data may be stored on and retrieved from any type of computer-readable medium. For some embodiments of the financial index, the instruments may include any type of non-equity instrument or non-equity financial product. The asset data may include, for example, prices (bid and/or ask), yields, rates (interest, inflation, FX, etc.), coupons, volume, maturities, notional amounts, credit ratings, sector classifications, and so forth. In some embodiments, the regional data and the category data obtained in blocks 304 and 312 may include the asset data, and block 320 may be omitted.

In block 324, constituent financial instruments to be included in the index are selected based at least in part on the asset data, the category data, and/or the regional data. In some embodiments of the financial index, only non-equity financial instruments are selected for the index. The constituents may be selected for each of the categories in each of the regions represented in the index. In some implementations, if a category weight, a regional weight, or a combination of such weights is sufficiently small (e.g., less than or equal to a threshold value), constituent financial instruments are not selected for that category and/or region, because their contribution to the index would be sufficiently small. Such implementations advantageously increase computational performance for the method 300 by reducing the processing load for selecting the constituents. In some embodiments, the threshold value is zero (e.g., constituents are not selected if the category/region is excluded from the index).

In some embodiments, the constituents in a category in a region are selected according to one or more objective rules. The rules for the categories may vary according to specific characteristics of the market for the instruments in a particular region. For example, for market segments with a large number of potentially illiquid instruments, the rules may limit the number of instruments (to reduce possible liquidity problems) while retaining the exposure profile of the broader market. The rules may be established to retain the replicability and investability of the index.

In certain embodiments of the index, the asset data obtained in block 320 is used to determine which financial instruments are included in a category for a region. In certain such embodiments, the category data and/or the regional data can also be used in selecting the constituents. For example, a computer system can automatically process the asset data (and/or category/regional data) according to one or more objective rules to select a number of financial instruments for inclusion in the index.

As an illustrative example of rules for selecting constituents for the category of corporate debt instruments, in some embodiments up to 200 instruments are selected from the universe of non-callable, fixed rate, coupon bond issues with a minimum outstanding amount of USD 500 million. The bonds in the universe have at least 12 months to maturity and an average credit rating of investment grade (e.g., based on averaging individual ratings provided by rating services such as Fitch, Moody's, and Standard & Poors). In some of these embodiments, bonds are selected from the universe by application of the following rules in a three-step process.

First, the bonds are classified in an industry sector according to the principle business engaged in by the issuing corporation. Possible industry sectors include basic materials, consumer goods, consumer services, financials, health care, industrials, oil and gas, technology, telecommunications, and utilities.

Second, each bond is assigned to a sector-maturity matrix. The number of sectors and the number of maturity bands may vary with the overall size of the market. For example, for markets with a size greater than USD 250 billion equivalent, one possible matrix includes four sectors and three maturity bands. The four sectors are (i) financial senior debt, (ii) financial subordinated debt, (iii) non-financial consumer (e.g., consumer goods, consumer services, technology, and telecommunications), and (iv) non-financial industrial (e.g., basic materials, health care, industrials, oil and gas, and utilities). The three maturity bands are (i) 5 year segment (maturity range 1-7 years), (ii) 10 year segment (maturity range 7-15 years), and (iii) 30 year segment (maturity range greater than 15 years). For markets with smaller sizes, the matrix may include fewer sectors and fewer maturity bands.

In some embodiments, a target number of constituent bonds is determined for each cell in the sector-maturity matrix. For example, the target number may be calculated by multiplying the market share of each cell by the total number of constituent bonds to be selected for the category (e.g., 200 in one case) and rounding to the nearest integer.

Third, bonds assigned to each cell in the sector-maturity matrix are ranked according to one or more ranking factors. The ranking factors may include, for example, the outstanding amount of the bond issue, time to maturity, time since issue, size of the issuer, etc. For each cell in the matrix, the highest ranked bonds are selected as constituents for the index until the target number for the cell has been reached.

The above example for selecting constituent instruments for a corporate debt category is intended to be illustrative and not limiting, and the rules for corporate debt selection may be different in other embodiments. A person of ordinary skill will understand that one or more rules for selecting constituents in other categories and other regions may be established.

Index and Subindices

In block 328, the constituents selected in block 324 are assembled into subindices for each of the categories of instruments in each of the regions. The subindices may be calculated to reflect a price value, a total return value (e.g., price plus returned interest), or some other suitable value. For example, derivative subindices (e.g., interest rate swaps) may be valued as standard carry indices. The constituents making up a subindex may be weighted by any suitable weighting scheme including equal weighting, price weighting, market capitalization weighting, trade weighting, GDP-weighting, and so forth. Subindices for different categories in different regions may be weighted differently. For example, in one implementation, the following weightings are applied to constituents in the subindices: (i) bonds in the same currency within an instrument category are weighted by market capitalization; (ii) bonds in different currencies within an instrument category are GDP-weighted; (iii) swaps in the same currency within an instrument category are equal weighted; (iii) swaps in different currencies within an instrument category are GDP-weighted; (iv) FX forwards for a single currency are equal weighted; (v) emerging markets FX subindices are trade weighted; and (vi) other multi-currency categories are trade-weighted according to the relative share of imports and exports. The above are examples, and other weightings are possible for some or all of the constituents included in subindices.

In block 332 of the example method 300, the financial index is assembled from the subindices (denoted by S), the regional weights (denoted by $W_R$), and the category weights (denoted by $W_C$). For example, in some embodiments, the net contribution of a subindex to the financial index is obtained by multiplying the regional weight $W_R$ by the category weight $W_C$ by the value of the subindex S. As discussed above, the regional weights $W_R$ and/or the category weights $W_C$ may be different for different subindices. The value of the financial index can be obtained by summing the net contributions from each of the subindices, e.g., by summing the values $W_R \times W_C \times S$ for all the subindices in the index.

FIG. 4 includes a table 400 that provides an example of regional weights, category weights, and subindex weights (e.g., $W_R \times W_C$) for an embodiment of a financial index including five regions. In other embodiments, different regions, categories, weightings, and subindices may be used. A person of ordinary skill will recognize that compilations of weights (such as the example shown in TABLES 1A-3 and FIG. 4) may vary slightly due to the choice of numerical precision (e.g., rounding) used to display the weights.

The regional and/or category weights can change with time in accordance with changes in parameters (e.g., GDP) used to determine the weights. For example, Table 1 shows how GDP weights vary or fluctuate over a four year time period for one embodiment of the financial index. Additionally, regional and/or category weightings may change if a region and/or category is added to or deleted from the index and/or if significant changes to the relative importance of regions and/or categories necessitate readjustment of the weights. Accordingly, certain embodiments of the index provide for reweighting of the index from time to time, as the weighting parameters change. For example, in some embodiments of GDP-weighted indices, the index is reweighted quarterly or annually. In other embodiments, the index can be reweighted more frequently or less frequently.

The constituent instruments as well as the individual weights of the instruments in a subindex may also change with time. For example, as discussed above, subindices may include constituents that are GDP weighted, trade weighted, market capitalization weighted, etc. Accordingly, a subindex may be reweighted from time to time as the constituent weights change. Further, in certain embodiments using rules-based constituent selection, the constituents for a subindex may change with time. In certain such embodiments, subindices may be rebalanced from time to time to add and/or delete constituents. Rebalancing may be done monthly or quarterly in some embodiments. Other rebalancing time periods may be used.

In certain embodiments of the method 300, in block 336, one or more values for the index may be determined. For example, in certain such embodiments, the method 300 may include determining a price and/or total return for the index. One or more financial analytics may also be determined for the index (e.g., yield, duration, convexity, etc.). In certain such embodiments, the value and/or the analytics can be output, for example, to a computer-readable medium (e.g., for temporary or permanent storage), communicated over a network (e.g., the Internet, a company intranet, a wireless network, a LAN or WAN, etc.), communicated to an output system (e.g., a graphical user interface, a display, a financial ticker, etc.), and so forth. In some embodiments, the values and/or analytics may be output to other computer systems such as, for example, a fund management system configured for managing a fund (e.g., an ETF, mutual fund, etc.) with an investment objective of tracking the index (see, e.g., FIG. 6).

Accordingly, certain embodiments of the method 300 advantageously can transform the regional data, the category data, and/or the asset data into regional weights, category weights, and lists of constituent financial instruments that are suitable for financial subindices designed to track the performance of various categories of assets in various regions of the world. Additionally, certain embodiments of the method 300 advantageously can be used to transform the weights and the subindices into a global fixed income index. Thus, such embodiments of the method advantageously transform "raw" data representing real-world quantities (e.g., regional geography, economic output of nations, assets of governments and corporations, etc.) into index values (e.g., price, total return, etc.) and analytics (e.g., yield, duration, convexity, etc.) that provide an aggregate picture of global economic growth and development in the world. Further, the index values and analytics provided by embodiments of the method have many practical and advantageous uses such as being used as benchmarks to measure performance of financial portfolios, being used as the basis for a mutual fund, ETF, or financial product, being used to provide investment advice, and so forth.

Currencies and Hedging

In various embodiments, the value of the financial index may be calculated in one or more currencies. For example, the value of the index (and/or a subindex) may be calculated in U.S. dollars, euros, Great Britain pounds, Japanese yen, and/or other currencies. In some embodiments, the index is calculated in terms of a local currency return assuming the index invests funds in each local currency represented in the index and the individual funds remain in that currency.

In other embodiments, the index can be hedged to account for some or all of the currency risk in the index. For example, the index value may be determined as unhedged, partially hedged, and/or fully hedged. Fully or partially hedged indices may more adequately reflect return for investors attempting to reduce currency risk. Hedged index returns may be calculated based at least in part on spot foreign exchange rates and/or forward currency contracts.

Embodiments of some partially hedged indices hedge some, but not all, of the currencies in the index. For example, currencies in some of the regions may be hedged and others not hedged (e.g., currencies in developed and/or developing countries are hedged and currencies in emerging markets are not hedged). In one embodiment, exposures to currencies of the U.S., the European Union, Japan, and countries included in the Other Industrialized Countries region are hedged, and exposures to currencies of countries in the emerging markets region are not hedged. In other embodiments, some or all emerging markets currency exposure may be hedged.

In some embodiments, a hedge ratio is defined as the proportion of the index's currency exposure that is hedged. The hedge ratio can be varied to provide index values that are partially or fully hedged to varying degrees. In some embodiments, the index can be over-hedged (e.g., using a hedge ratio greater than 1) to reflect a portfolio seeking increased currency exposure. In some embodiments, hedge ratios can be established for particular currencies, for particular regions, for particular categories, for particular constituents, and/or for particular subindices.

Analytics

One or more analytics can be calculated for the index, for one or more subindices, for the regions, for the categories, and/or for one or more constituents. In various embodiments, the analytics can include some or all of the following: price, total return, market value, yield, duration (Macaulay and/or modified), convexity, coupon, maturity, life, quality (rating), option adjusted spread, option adjusted duration, option adjusted convexity, spreads to other benchmarks (e.g., Treasuries), and so forth. In some embodiments, one or more computers or processors are used to calculate the analytics. The analytics may be stored in any suitable computer-readable medium, communicated over a network (e.g., the Internet), etc. As is well known, investors, financial professionals, investment advisors, portfolio managers, and others can use one or more of the analytics for many practical purposes including, for example, making investment decisions, financial consultation, asset management, index portfolio replication, benchmarking, market timing, development of financial products, etc.

Additional Examples and Embodiments

In certain embodiments, the financial index can be based at least in part on one or more component indices. For example, in some embodiments, the global financial index can be an index of indices. In one illustrative example, for at least some of the instrument categories and/or regions, an existing index is selected to represent the appropriate category and/or region. The value of the financial index may be calculated using the value of the existing index for the category and/or region and applying the appropriate category and/or regional weights to the existing index. As an example, in some embodiments of the financial index, the category of Fixed Rate Corporate Bonds in the U.S. region can be represented (at least in part) by, e.g., the Lehman U.S. Aggregate Corporate Index, the category of Externally Denominated Debt in the EM region can be represented (at least in part) by, e.g., the J.P. Morgan Emerging Markets Bond Index Global (JPM EMBIG), and so forth. Many variations of an index comprising indices (in addition to or instead of some constituent instruments) are possible in other embodiments.

As discussed above with reference to FIGS. 2B and 2D, a portfolio of fixed income securities selected to track asset allocations in a GDP-weighted global fixed income index advantageously can provide an investor with higher returns for a given risk level than a market-capitalization weighted fixed income portfolio. Investors may desire to have a portfolio that includes equity securities as well as fixed income securities, for example, to have a diversified financial portfolio that approaches the "efficient frontier." Accordingly, in some embodiments, the financial index may include one or more categories of equity instruments (and/or equity derivatives, equity indices, etc.) in one or more regions. One or more equity category and/or regional weights can be determined and used for calculation of the financial index value. In some such embodiments, the financial index represents a combined mix of equity and fixed income instruments. In some embodiments, category and/or regional weights for equities may be non-market capitalization weighted (e.g., GDP-weighted). Financial portfolios that attempt to track and/or replicate such a combined index may, in some case, provide higher rates of return for given levels of volatility than a portfolio of equity instruments or a portfolio of fixed income instruments.

Examples of Systems for Generating and Calculating a Fixed Income Index

Figure 5:
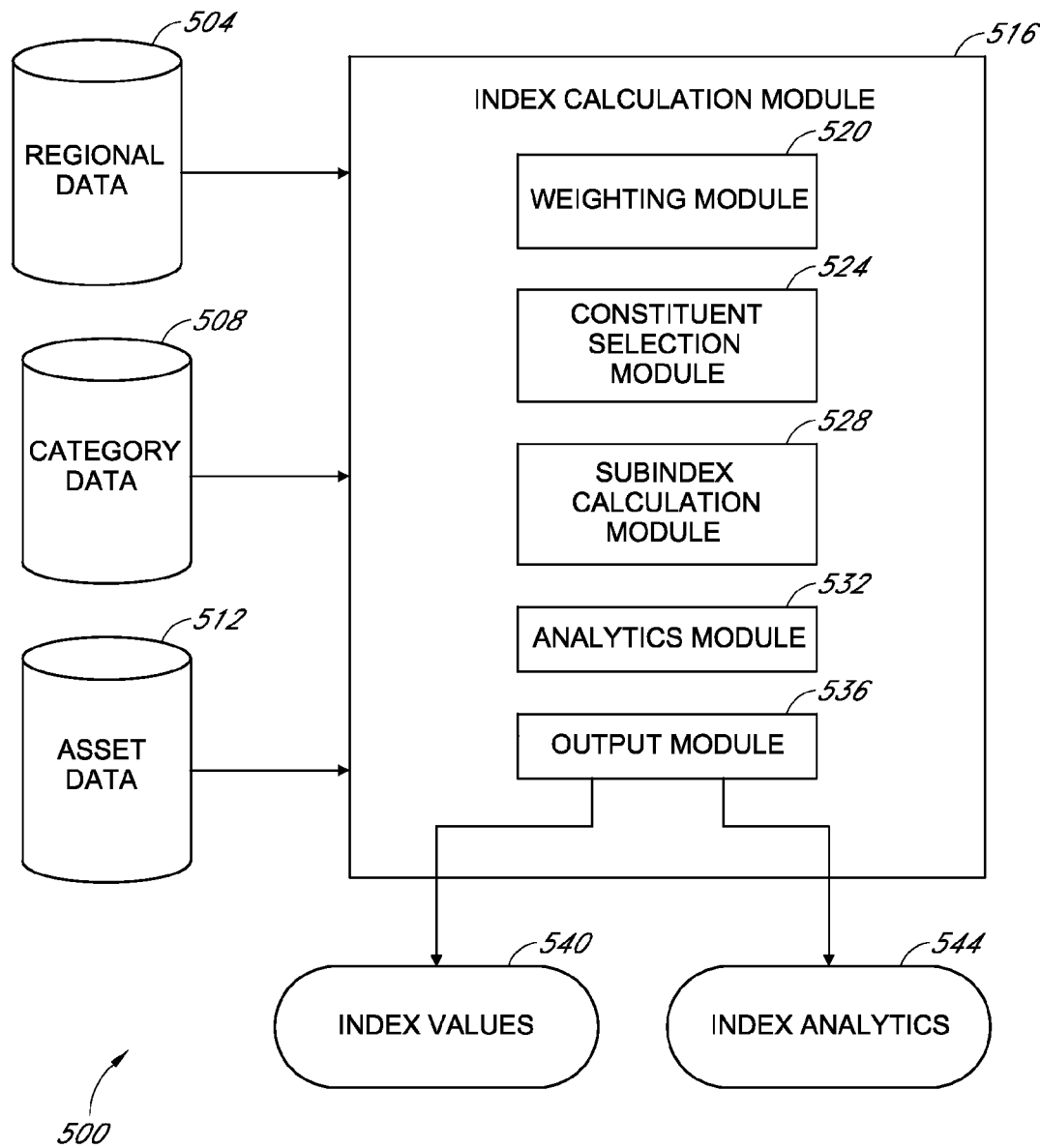
FIG. 5 is a block diagram that schematically illustrates an embodiment of a financial index calculation system.

FIG. 5 is a block diagram that schematically illustrates an embodiment of a financial index calculation system 500. The index calculation system 500 may be configured to implement embodiments of the method 300 for generating a financial index described above with reference to FIG. 3. In certain embodiments, the index calculation system 500 may be programmatically performed by a computer system.

The embodiment of the index calculation system 500 illustrated in FIG. 5 includes data repositories 504, 508, and 512 configured to be in communication with an index calculation module 516. The data repositories 504, 508, and 512 may be any suitable type or combination of computer-readable storage media including, for example, volatile or non-volatile memory, magnetic storage, optical storage, random access memory, read only memory, semiconductor memory, and so forth. In some embodiments, some or all of the data repositories 504, 508, and 512 may be combined in a single storage medium or distributed across multiple storage media. In some embodiments, the index calculation module 516 is implemented as a software component (executable by a processor) that can receive data stored in the repositories 504-512. The index calculation module 516 may be configured to include or to communicate with computer-readable storage other than the repositories 504-512 shown in FIG. 5. For example, in some embodiments, the index calculation module 516 may receive (and or store) information including, but not limited to, exchange rates, inflation rates, interest rates (e.g., LIBOR), yield curves, etc.

As discussed above with reference to the method 300, embodiments of the financial index may be determined based at least in part on regional data (stored in the repository 504), category data (stored in the repository 508), and asset data (stored in the repository 512). The index calculation module 516 can be configured to access the data in the repositories 504-512 and generate a financial index based at least in part on this data.

In the illustrated embodiment, the index calculation module 516 includes a weighting module 520, a constituent selection module 524, a subindex calculation module 528, an analytics module 532, and an output module 536. Some or all of the modules 520-536 may be implemented as software components in various embodiments of the system 500.

In some embodiments, the weighting module 520 determines the regional weights and/or the category weights for the index based on the regional data, the category data, and/or the asset data. As described herein, in some embodiments at least one of the regional weights and at least one of the category weights is not a market capitalization weight. In some such embodiments, none of the regional weights or the category weights is a market capitalization weight.

In some embodiments, the weighting module 520 is configured to receive one or more of the regional and/or category weights. For example, one or more regional and/or category weights may be determined externally to the system 500 and communicated to the system 500 over a network or made accessible to the system 500 through a data repository. In some implementations, one or more regional and/or category weights are determined by a separate computer system based on econometric data, financial data, etc. In other embodiments, a portfolio manager, index governance committee, or other person or entity may be responsible for establishing at least some of the weights, which can be input to the system 500. In some embodiments, the system 500 may store one or more of the received weights in computer storage so that the one or more weights are accessible to the weighting module 520 (or other modules).

The constituent selection module 524 may be configured to select constituent financial instruments for each of the categories in each of the regions included in the index. In some implementations, if a regional weight and/or a category weight is less than or equal to a threshold value (which may be zero), the constituent selection module 524 does not perform the selection for that region and/or category, which advantageously may improve computational efficiency of the system 500. In some embodiments, the constituent selection module 524 is configured to select non-equity financial instruments for inclusion in the index.

Embodiments of the subindex calculation module 528 can be used to determine a subindex for each of the categories in each of the regions represented in the index. The subindex calculation module 528 can determine a subindex based at least in part on the constituents selected by the constituent selection module 524. In some embodiments, the subindex calculation module 528 is configured to receive (and/or store) information on one or more existing indices or subindices that represent (in whole or in part) constituents in one or more instrument categories and/or regions.

In the embodiment of the system illustrated in FIG. 5, the analytics module 532 calculates the index based at least in part on the subindices calculated (and/or received) by the subindex calculation module 528 and the regional and category weights calculated, received, and/or stored by the weighting module 520. The analytics module 532 may also be configured to calculate one or more analytics associated with the index, subindices, and/or constituents. Various analytics have been described above including but not limited to price, total return, market value, maturity, duration, convexity, and so forth. In some embodiments, certain of the analytics may be calculated in different currencies. The analytics modules 532 may also be configured to calculate hedged versions of the index and/or the value of the index in one or more currencies. In other embodiments, the index may be calculated by an index module that is separate from the analytics module 532, or the index may be calculated by the subindex module 528. Many variations are possible.

In some embodiments, the output module 536 outputs information related to the index, the subindices, and/or the constituents. In the illustrated embodiment, the output module 536 outputs index values 540 (e.g., price, total return, market value, etc.) and analytics values 544 (e.g., duration, maturity, convexity, etc.) associated with the index, subindices, and/or constituents. The output module 536 may output some or all of this information to computer storage, to a graphical user interface, to an electronic database, report, message, or record, to a user of the system 500, and so forth. In some implementations, information such as the output data 540, 544 may be made accessible over a network (e.g., the Internet), on an FTP-site, via electronic mail, text-messaging, and so forth. The output data 540, 544 may be communicated to financial exchanges, clearinghouses, and/or websites, where the data may be displayed (e.g., on a ticker) or otherwise used. Investors, portfolio managers, investment advisors, financial professionals, and the like may utilize the output data 540, 544 for many practical purposes including, for example, investment, consultation, asset management, index portfolio replication, benchmarking, development of financial products, etc.

Example Portfolios and Funds Based on Embodiments of the Index

Portfolios of securities can be developed that attempt to track, or partially or fully replicate, embodiments of the financial index or components of the financial index (e.g., a subindex or a combination of constituents or subindices). In some embodiments, investment companies can be formed to sell and redeem shares based on such portfolios. In some embodiments, the investment company may have one or more classes of shares that are bought from and redeemed with the investment company (either directly or through an intermediary), and/or one or more classes of shares that are listed for trading on a national securities exchange and that are bought and sold at negotiated market prices. In some implementations, open-end funds, closed-end funds, exchange traded funds, and/or unit investment trusts could be set up to provide shares in portfolios based at least in part on one or more of the indices described herein. In some embodiments, a fund may be passively managed, with an investment objective to track performance of an embodiment of the financial index. In other embodiments, a fund may be actively managed with an investment objective of meeting or beating the performance of an embodiment of the index. For example, in some cases, a portfolio manager can attempt to achieve greater returns than the index as a whole and/or greater returns than a subset of the index (e.g., a subindex, combinations of subindices, groups of constituents in categories, regions, industrial sectors, etc.).

Portfolios that attempt to replicate an embodiment of the financial index (or components thereof) may be created using any suitable replication technique such as, for example, full replication, stratified sampling, linear programming, variance minimization, and so forth. In some embodiments, an index portfolio may be synthetically replicated using derivative instruments (e.g., futures, forwards, swaps, etc.).

Financial products (e.g., total return swaps, structured notes, derivatives, etc.) may be developed based at least in part on embodiments of the financial index (or components of the financial index).

Figure 6:
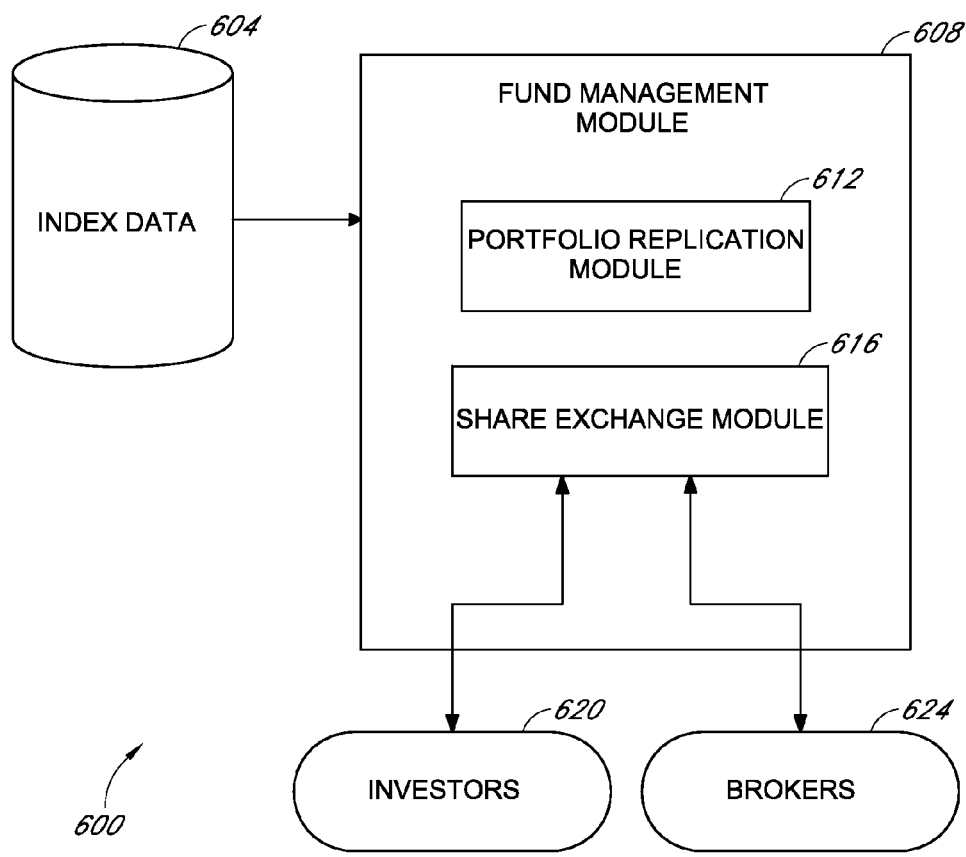
FIG. 6 is a block diagram schematically illustrating an embodiment of a system for managing a fund that is based at least in part on an embodiment of the financial index.

FIG. 6 is a block diagram schematically illustrating an embodiment of a system 600 for managing a fund based at least in part on an embodiment of the financial index. In certain embodiments, the fund management system 600 may be programmatically implemented by a computer system. In various embodiments, the system 600 may be used to manage a fund such as a closed end fund, an open end (e.g., a mutual fund), a unit investment trust, an index fund, an exchange traded fund (ETF), or some other suitable investment vehicle. The fund may be passively managed or actively managed. Although the fund management system 600 shown in FIG. 6 is depicted as separate from the index calculation system 500 shown in FIG. 5, this is not a requirement, and in other embodiments some or all of the components of the systems 500, 600 (e.g., modules and data repositories) are shared between the systems 500, 600. For example, in one embodiment a single system is used to generate the index and then manage a fund based on the index. In other embodiments, index generation features and fund management features are distributed across one or more computers or processors of a distributed computing system (e.g., a networked computer system).

In the illustrated embodiment, the system 600 includes a data repository 604 configured to be in communication with a fund management module 608. The data repository 604 may be any suitable type or combination of computer-readable storage including, for example, volatile or non-volatile memory, magnetic storage, optical storage, random access memory, read only memory, semiconductor memory, and so forth. In some embodiments, the data repository 604 may be a single storage medium or distributed across multiple storage media. In some embodiments, the fund management module 608 is implemented as a software component (executable by a processor) that can receive data stored in the repository 604. The fund management module 608 may be configured to include or to communicate with computer-readable storage other than the repository 604 shown in FIG. 6. For example, in some embodiments, the fund management module 608 may receive (and or store) information including, but not limited to, exchange rates, inflation rates, interest rates (e.g., LIBOR), yield curves, etc.

The data repository 604 can store index data that represents any information related to the financial index. For example, the repository 604 may store some or all of the regional data, the category data, the asset data, the regional weights, the category weights, the constituents, the subindices, and/or analytics based the index. In some embodiments, the data repository 604 may be in communication with the data repositories 504-512 of the index calculation system 500. In some embodiments, the data repository 604 is in communication with the output module 536 of the index calculation system 500 and receives and stores the index values 540 and/or the index analytics 544. In some implementations, the index data is communicated to the fund management module 608 using secure transmission protocols. For example, the index data (or a transmitted copy of the index data) may be encrypted.

In the illustrated embodiment, the fund management module 608 includes a portfolio replication module 612 and a share exchange module 616. The portfolio replication module 612 can be configured to attempt to replicate embodiments of the financial index (or portions thereof). As discussed above, the portfolio replication module 612 may use one or more replication techniques such as, for example, full replication, stratified sampling, linear programming, variance minimization, derivatives, etc. to determine a target portfolio based at least in part on the index. As discussed above, embodiments of the financial index can be designed to be replicable and investable. Accordingly, the portfolio replication module 612 advantageously may be able to implement any of a number of replication techniques to achieve one or more goals such as: reducing index tracking error, reducing transaction costs in the target portfolio, matching desired index attributes (e.g., return, duration, maturity, convexity, cash flows, quality, callability, sector exposure, currency exposure, etc.), providing suitable liquidity for the target portfolio, and so forth.

In some implementations of the system 600, the fund management module 608 can be configured to issue buy and/or sell orders for securities that are to be held in the target portfolio determined by the portfolio replication module 608. In other embodiments, the fund management module 608 communicates information about the target portfolio to a portfolio manager who acquires the securities.

In certain embodiments, the portfolio replication module 612 determines a share price for shares in the target portfolio. For example, in the case of a mutual fund or index fund, the share price may be a net asset value (NAV) calculated once per day (e.g., at the close of regular trading on a major exchange). The NAV may be calculated by dividing the net assets of the target portfolio by the number of fund shares outstanding.

In the embodiment illustrated in FIG. 6, the fund management module 608 also includes a share exchange module 616 that can be configured to manage the exchange (e.g., issuance and/or redemption) of shares in the fund. The share exchange module 616 may receive exchange orders from investors 620 and/or brokers 624 and may execute those orders or communicate them to a clearinghouse, specialist, or market maker for execution. In some implementations, the investors 620 and/or broker 624 may communicate with the share exchange module 616 over a network such as a local or wide area network (LAN or WAN), an organization's intranet, the Internet, the World Wide Web, or combinations of the same, or the like. In some embodiments, the share exchange module 616 maintains shareholder account data including the number of shares owned by each shareholder. In other embodiments, a shareholder account module or separate accounting system maintains the shareholder account data.

In some implementations, an investment company uses an embodiment of the system 600 to manage an exchange traded fund. Shares in the fund can be issued and publicly listed and traded on a national stock exchange at prevailing market prices. Investors generally buy and sell shares at negotiated prices on the secondary market (e.g., through a broker) rather than by direct exchange with the investment company. Institutional investors may purchase shares via the share exchange module 616, generally in return for large baskets of securities (creation units). In certain implementations, the investment company may additionally have a class of conventional shares that trade at NAV. In certain such implementations, an investor may communicate an order to the share exchange module 616 to exchange conventional shares and/or to convert conventional shares to exchange trade shares.

The various blocks and modules of the methods and systems described herein can be particularly implemented as software applications, hardware and/or software programs, or components on one or more computers, such as servers. The modules may include, but are not limited to, any of the following: software or hardware components such as object-oriented software components, class components and task components, processes, methods, functions, attributes, procedures, subroutines, segments of program code, drivers, firmware, microcode, circuitry, data, databases, data structures, tables, arrays, variables, combinations of the same, and the like. While various modules may be described separately in the foregoing, they may share some or all of the same underlying logic or code.

In addition, each of the methods, processes, blocks, and algorithms described herein may be particularly embodied in, and fully or partially automated by, modules executed by one or more computers or computer processors. The processes and algorithms may also be particularly implemented partially or wholly in application-specific circuitry. For example, in some embodiments, a field-programmable gate array (FPGA), an application-specific integrated circuit (ASIC), and/or a programmable logic device (PLD) may be particularly configured to perform one or more blocks or modules of the disclosed methods and systems. In some embodiments, a general purpose computer (or processor) may be particularly configured to emulate, partially or wholly, such application-specific circuitry.

Some or all of the computers or computer processors may be configured to communicate over a network, such as the Internet. The modules may be stored on any type of computer-readable medium or computer storage device. The results of the disclosed processes and process steps (and/or any information relating thereto) may be stored, persistently or otherwise, in any type of computer storage. Some embodiments include a computer-readable medium having stored thereon a set of program modules that, when executed by a computer, cause the computer to particularly perform an embodiment of the disclosed methods and processes. The computer-readable medium may comprise a storage medium.

The example embodiments described herein may have several features, no single one of which is indispensable or solely responsible for their desirable attributes. The various features and processes described above may be used independently of one another, or may be combined in various ways. All possible combinations and subcombinations are intended to fall within the scope of this disclosure. In addition, in some implementations, certain method or process blocks or steps may be omitted, combined, or arranged differently than shown and described herein. The methods and processes described herein are also not limited to any particular sequence, and the blocks, states, or steps relating thereto can be performed in other sequences that are appropriate. For example, described blocks, states, or steps may be performed in an order other than that specifically disclosed, or multiple blocks, states, or steps may be combined in a single block, state, or step.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain embodiments of the inventions disclosed herein have been described, these embodiments have been presented by way of example only, and are not intended to limit the scope of the inventions disclosed herein. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, substitutions, equivalents, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

APPENDIX A

In some embodiments, the financial index, I, can be written as follows:

$$I = \sum_{k \in Regions} w_R^k \sum_{j \in Categories} w_{C,k}^j S_{jk}. \tag{1}$$

The regional weights, $w_R$, include a superscript counter, k, that runs over all the regions included in the index. The category weights, $w_C$, include a subscript counter, k, to indicate that the weights represent the categories for the kth region. The category weights also include a superscript counter, j, that runs over all the categories used for the kth region. The weights may, but need not, be normalized so that they add up to one. For example, in some embodiments $$\sum_{k \in Regions} w_R^k = 1 \text{ and } \sum_{j \in Categories} w_{C,k}^j = 1.$$

The embodiment of the financial index, I, represented by Equation (1) is a linear combination of subindices, $S_{jk}$, that can be assembled for each of the categories, j, in each of the regions, k. For example, subindices can be assembled for regions including, e.g., the U.S., the Eurozone, and emerging markets (EM). Categories can include, for example, corporate bonds, inflation-indexed bonds, and externally-denominated government bonds. Thus, in this example, subindices could be assembled for, e.g., U.S. corporate bonds, U.S. inflation-indexed bonds, Eurozone inflation-indexed bonds, emerging markets (EM) externally-denominated bonds, and so forth. Additional examples of regions and categories (and weights) are shown in Tables 1A-3 and FIG. 4. In some embodiments, one or more of the subindices can be represented as (and/or include) an existing financial index that is designed to track the performance of a particular category and/or region. In some such embodiments, the financial index can be a weighted index of indices.

In some embodiments, the financial index, I, can be calculated by applying the appropriate category weight and regional weight to each subindex $S_{jk}$ and then summing these contributions to determine a value for the index. In various embodiments the index, I, can be valued as a price index or a total return index (e.g., reflecting price changes and income received).

In some embodiments, a particular category and/or region may be excluded from the index. For example, certain countries/regions (or categories of investment in the country/region) may be considered sufficiently insubstantial or unimportant to the universe of global fixed income debt that the region and/or category is not included in the index. In some embodiments, suitable threshold levels may be established, and regions and/or categories are included only if the contribution of the region and/or category exceeds the appropriate threshold. For example, in some embodiments, a region may be excluded from the index if the region's GDP relative to global GDP is below a threshold GDP level (e.g., 0.5%). In terms of Equation (1), excluded regions and/or categories can be represented by setting the appropriate weight to zero (or a sufficiently small value). In some implementations, if a particular weight is zero (or below a threshold weight value), more efficient calculation of the index is achieved by not accumulating the subindex associated with that particular weight.

The embodiment of the financial index represented by Equation (1) is determined from weighted sums of the subindices, $S_{jk}$, over all regions and over all categories. In other embodiments, only a subset of the regions and/or categories are used in the sums in order to determine characteristics of particular markets, instrument classes, industry sectors, and so forth. For example, each of the individual subindices reflects the accumulated contribution of the constituent instruments in a particular category and region. A global index for each of the categories, $I_j^{global}$, can be accumulated by summing over all of the regions for any category, j:

$$I_j^{global} = \sum_{k \in Regions} w_R^k S_{jk}. \qquad (2)$$

For example, a global index can be determined for corporate bonds, for interest rate swaps, for externally-denominated debt, and so forth. A regional index for each of the regions can be determined by summing over all of the categories in any region, k:

$$I_k^{Regional} = \sum_{j \in Categories} w_C^j S_{jk}. \qquad (3)$$

For example, a regional index can be determined for the U.S. region, for the Eurozone region, for the emerging markets region, and so forth. In other embodiments, different combinations of the subindices and weights may be accumulated in order to track or evaluate the market performance of any suitable set of categories and/or regions. For example, the sums in Equations (2) and (3) may be performed over only a subset of the regions and/or categories. Many combinations of the constituents and subindices are possible.

In some embodiments, analytics can be calculated for some or all of the constituents, the subindices, the global indices, the regional indices, and/or the index as a whole. For example, the analytics can include price, total return, market value, yield, duration (Macaulay and/or modified), convexity, coupon, maturity, life, quality (rating), option adjusted spread, option adjusted duration, option adjusted convexity, spreads to other benchmarks (e.g., Treasuries), and so forth.

In certain implementations, determination of the regional and category weights, selection of the constituents, determination of the subindices and the financial index, and/or calculation of the analytics are performed by a computer system. In various embodiments, a computer, a processor, and/or an application specific circuit can be particularly programmed to calculate the indices and/or analytics discussed above with reference to Equations (1)-(3).

What is claimed is:

1. A computer-implemented method of managing a fixed income financial index, the method comprising:
   storing in a computer memory a regional weight for each of a plurality of regions of the world, each of the regional weights based at least in part on a gross domestic product for the region;
   storing in a computer memory, for each of the plurality of regions, a category weight for each of a plurality of categories of fixed income financial instruments issued from the region;
   storing in a computer memory asset data for a universe of fixed income instruments representing each of the plurality of categories of instruments in each of the plurality of regions, the fixed income instruments comprising one or more of the following: (i) fixed income securities, (ii) fixed income derivatives, or (iii) fixed income forwards;
   programmatically allocating, via execution of instructions by one or more computer processors, one or more constituent instruments from the universe of fixed income instruments to each of the plurality of categories in each of the plurality of regions;
   programmatically determining a constituent weight for each of the constituents allocated to each of the plurality of categories in each of the plurality of regions;
   programmatically calculating a subindex for each of the plurality of categories in each of the plurality of regions, each subindex based at least in part on the allocated constituents and the respective constituent weights, wherein the constituent weights for a first subindex comprise market capitalization weights and the constituent weights for a second subindex comprise gross-domestic product weights; and
   programmatically transforming the subindices, the category weights, and the regional weights into a value for the financial index.

2. The method of claim 1, wherein the category weights for at least one region are equally-weighted or proportionally-weighted.

3. The method of claim 1, wherein the fixed-income instruments comprise (i) fixed income securities, (ii) fixed income derivatives, and (iii) fixed income forwards.

4. The method of claim 1, wherein the constituent weights for at least one category in at least one region are based at least in part on a gross domestic product of the respective region.

5. The method of claim 1, wherein programmatically transforming the subindices, the category weights, and the regional weights into a value for the financial index comprises calculating a total return for the financial index.

6. The method of claim 1, wherein programmatically transforming the subindices, the category weights, and the regional weights into a value for the financial index comprises calculating a return for the index that is at least partially currency hedged.

7. The method of claim 6, wherein the at least partially currency hedged return reflects currency hedging for all currencies represented in the financial index.

8. The method of claim 6, wherein the at least partially currency hedged return reflects currency hedging for a first set of currencies and no currency hedging for a second set of currencies.

9. The method of claim 8, wherein the first set of currencies comprise currencies from developed countries and the second set of currencies comprise currencies from emerging market countries.

10. The method of claim 1, further comprising programmatically calculating analytics associated with the financial index or a component of the financial index.

11. The method of claim 10, wherein the analytics comprise one or more of price, total return, market value, yield, duration, convexity, coupon, maturity, life, quality, option adjusted spread, option adjusted duration, option adjusted convexity, and spread to a benchmark.

12. The method of claim 1, wherein none of the regional weights reflects a market capitalization of the respective region.

13. The method of claim 1, wherein the regions comprise the United States and a plurality of emerging markets.

14. The method of claim 13, wherein the regions further comprise a plurality of countries in the Eurozone.

15. The method of claim 1, wherein at least one of the category weights does not reflect a market capitalization of the fixed income instruments included in the respective category.

16. The method of claim 15, wherein none of the category weights reflects a market capitalization of fixed income instruments included in the respective category.

17. The method of claim 15, wherein the at least one of the category weights is based at least in part on risk exposures for the fixed income instruments included in the respective category.

18. The method of claim 1, wherein the categories of fixed income financial instruments issued from at least one region comprise (i) derivatives or forwards based on underlying non-equity instruments, and at least one of (ii) inflation-linked government bonds, (iii) government debt denominated in non-domestic currency, or (iv) securitized debt.

19. The method of claim 18, wherein the derivatives comprise interest rate swaps.

20. The method of claim 1, wherein programmatically calculating a subindex comprises:
   programmatically calculating the first subindex for which the constituent weights comprise market capitalization weights; and
   programmatically calculating the second subindex for which the constituent weights comprise gross-domestic product weights.

21. The method of claim 1, wherein programmatically allocating one or more constituent instruments comprises:
   programmatically allocating a first plurality of fixed income instruments from a first region comprising a developed country, the first plurality comprising instruments in at least each of the following asset classes: (1) inflation-linked government debt and (2) interest rate swaps; and
   programmatically allocating a second plurality of fixed income instruments from a second region comprising an emerging market country, the second plurality comprising instruments in at least the following asset class: (3) government debt denominated in non-domestic currency.

22. The method of claim 21, wherein the first plurality further comprises instruments in the following asset classes: (4) corporate debt and (5) securitized debt, and the second plurality further comprises instruments in the following asset classes: (6) government debt denominated in domestic currency and (7) deliverable or non-deliverable currency forwards.

* * * * *